(12) United States Patent
Rick et al.

(10) Patent No.: US 7,321,749 B2
(45) Date of Patent: Jan. 22, 2008

(54) CELL SELECTION TECHNIQUES FOR FREQUENCY DIVISION MULTIPLE ACCESS SYSTEMS

(75) Inventors: Roland Rick, San Diego, CA (US); Thomas B. Wilborn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 10/683,639

(22) Filed: Oct. 9, 2003

(65) Prior Publication Data

US 2005/0079824 A1   Apr. 14, 2005

(51) Int. Cl.
*H04B 17/00* (2006.01)
(52) U.S. Cl. ............... 455/67.11; 455/436; 455/434
(58) Field of Classification Search .......... 455/434, 455/435.3, 426.1, 426.2, 435.1
See application file for complete search history.

(56) References Cited

U.S. PATENT DOCUMENTS

| 5,379,446 A | 1/1995 | Murase ............... 455/33.2 |
| 5,640,677 A * | 6/1997 | Karlsson ............... 455/434 |
| 6,101,383 A | 8/2000 | Poon ..................... 455/425 |
| 6,473,602 B1 * | 10/2002 | Bottomley ............ 455/226.1 |
| 6,614,806 B1 | 9/2003 | Nanni .................... 370/468 |
| 2003/0224790 A1 * | 12/2003 | Choi ..................... 455/435.3 |

FOREIGN PATENT DOCUMENTS

| EP | 1005181 | 5/2000 |
| WO | 0215444 | 2/2002 |

* cited by examiner

*Primary Examiner*—Sanh D. Phu
(74) *Attorney, Agent, or Firm*—Howard H. Seo; George J. Oehling; Thomas R. Rouse

(57) ABSTRACT

This disclosure is directed to power estimation techniques for use by a subscriber unit of a frequency division multiple access (FDMA) system during the cell selection process. The power estimation techniques recognize that adjacent cells, i.e., adjacent in terms of frequency, often have slight overlap. Thus, the power from a signal associated with one cell can cause power to be detected in an adjacent cell, even if no signal is actually present in the adjacent cell. In accordance with this disclosure, techniques are described for identifying, reducing or eliminating the detection of false positives in such adjacent cells. By identifying, reducing or eliminating the detection of false positives, the cell selection process can be accelerated and additional processing of false positive signals in such adjacent cells can be avoided.

19 Claims, 6 Drawing Sheets

CELL SELECTION TECHNIQUES FOR FREQUENCY DIVISION MULTIPLE ACCESS SYSTEMS

TECHNICAL FIELD

The disclosure relates to wireless communication and, more particularly, techniques for cell selection in wireless communication systems implementing frequency division multiple access (FDMA).

BACKGROUND

A wide variety of wireless communication techniques have been developed to facilitate wireless telecommunication. Frequency division multiple access (FDMA) refers to a wireless communication technique in which an allocated frequency spectrum is divided into a plurality of smaller frequency cells. Each cell of the allocated spectrum has a carrier signal that can be modulated with data. Dividing the allocated frequency spectrum into cells can increase the amount of data that can be communicated over the spectrum, and also provides an easy mechanism for allocating bandwidth to service providers. For example, specific cells may be allocated to specific service providers, and the wireless network of a given service provider may use one or more allocated cells in order to provide service to its subscribers.

The global system for mobile communications (GSM) standard, standardized by the European Telecommunication Standards Institute (ETSI), is one example of a system that makes use of FDMA techniques. In Europe, for example, frequency bands surrounding 900 megahertz (MHz) and 1800 MHz have been allocated for GSM. The frequency bands surrounding 900 and 1800 MHz are divided by GSM into approximately 548 frequency cells of approximately 200 kilohertz (KHz) per cell. The different cells are allocated to different service providers for use in the service providers' networks. Some cells are used as network beacons to inform subscriber units which cells are associated with a given network, while other cells are used only for delivering network traffic to and from mobile subscriber units. In a GSM network, the different frequency cells also make use of time division multiple access (TDMA), in which time slots are specifically assigned within the cells for time-allocated communication.

One challenge in systems that implement FDMA techniques, such as GSM, is the process of cell selection or acquisition by a subscriber unit. A subscriber unit refers to a device such as a mobile radiotelephone, or the like, which is used by the end user. In an FDMA system, the subscriber unit scans the various cells of the allocated spectrum, looking for the most desirable cell for telecommunication. The most desirable cell is typically a cell associated with the network of the service provider of the subscriber unit, or possibly a cell for which the service provider of the subscriber unit has a good roaming agreement. Cells having higher power signals are also more desirable than lower power cells, e.g., when choosing between cells in the network of a given service provider.

SUMMARY

In one embodiment, this disclosure describes a method comprising measuring power of a first signal associated with a first cell of a frequency division multiple access (FDMA) system, measuring power of a second signal associated with a second cell of the FDMA system, the second cell being adjacent to the first cell in terms of frequency, and setting a value indicative of the measured power of the second signal to a negligible value when the measured power of the second signal is more than a threshold value less than the measured power of the first signal.

In another embodiment, this disclosure describes a method comprising receiving a signal associated with a cell of an FDMA system, the cell spanning a first frequency range, and filtering the signal to a second frequency range, wherein the second frequency range is smaller than the first frequency range. The method further comprises measuring power of the filtered signal to identify an estimate of power associated with the cell.

In another embodiment, this disclosure describes a subscriber unit of an FDMA system comprising a receiver to receive a first signal associated with a first cell the FDMA system and a second signal associated with a second cell of the FDMA system, the second cell being adjacent to the first cell in terms of frequency, and a control unit to measure power of the first and second signals and set a value indicative of the measured power of the second signal to a negligible value when the measured power of the second signal more than a threshold value less than the measured power of the first signal.

In another embodiment, this disclosure describes a subscriber unit of an FDMA system comprising a receiver to receive a signal associated with a cell of the FDMA system, the cell spanning a first frequency range, and a control unit to filter the signal to a second frequency range, wherein the second frequency range is smaller than the first frequency range. In addition, the control unit measures power of the filtered signal to identify an estimate of power associated with the cell.

In another embodiment, this disclosure describes a computer-readable medium comprising instructions to cause subscriber unit of an FDMA system to measure power of a first signal associated with a first cell of the FDMA system, measure power of a second signal associated with a second cell of the FDMA system, the second cell being adjacent to the first cell in terms of frequency, and set a value indicative of the measured power of the second signal to a negligible value when the measured power of the second signal more than a threshold value less than the measured power of the first signal.

In another embodiment, this disclosure describes a computer-readable medium comprising instructions to cause subscriber unit of an FDMA system to receive a signal associated with a cell of the FDMA system, the cell spanning a first frequency range, and filter the signal to a second frequency range, wherein the second frequency range is smaller than the first frequency range. The instructions also cause the subscriber unit to measure power of the filtered signal to identify an estimate of power associated with the cell.

In another embodiment, this disclosure describes a subscriber unit of an FDMA system comprising means for receiving a first signal associated with a first cell the FDMA system and a second signal associated with a second cell of the FDMA system, the second cell being adjacent to the first cell in terms of frequency, means for measuring power of the first and second signals, and means for setting a value indicative of the measured power of the second signal to a negligible value when the measured power of the second signal more than a threshold value less than the measured power of the first signal.

In another embodiment, this disclosure describes a subscriber unit of an FDMA system comprising means for receiving a signal associated with a cell of the FDMA system, the cell spanning a first frequency range, and means for filtering the signal to a second frequency range, wherein the second frequency range is smaller than the first frequency range. The subscriber unit also includes means for measuring power of the filtered signal to identify an estimate of power associated with the cell.

The details of one or more embodiments are set forth in the accompanying drawings and the description below. Other features, objects, and advantages will be apparent from the description and drawings, and from the claims.

DETAILED DESCRIPTION

This disclosure is directed to power estimation techniques for use by a subscriber unit of an FDMA system during the cell selection process. The power estimation techniques recognize that adjacent cells, i.e., adjacent in terms of frequency, often have slight overlap. Thus, the power from a signal associated with one cell can cause power to be detected in an adjacent cell, even if no signal is actually present in the adjacent cell. In accordance with this disclosure, techniques are described for identifying, reducing or eliminating the detection of "false positives" in such adjacent cells, e.g., during a GSM power scan. In this disclosure, the phrase "false positives" refers to detection of power in a cell when a signal is not actually present in that cell. By identifying, reducing or eliminating the detection of false positives, the cell selection process can be accelerated and additional processing of false positive signals in such adjacent cells can be avoided.

Figure 1:
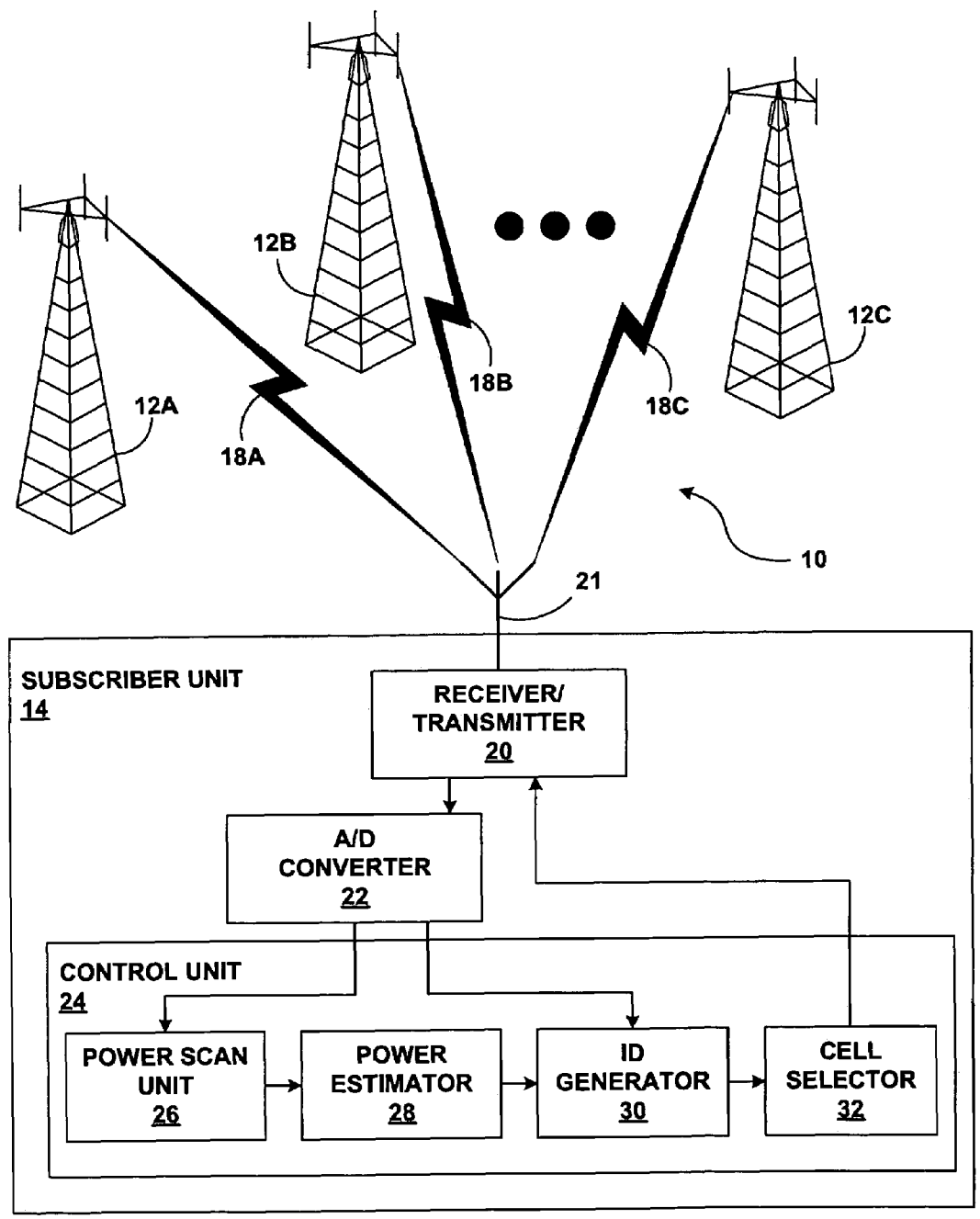
FIG. 1 is a block diagram illustrating a wireless communication system implementing FDMA communication techniques according to the teaching of this disclosure.

FIG. 1 is a block diagram illustrating a wireless communication system 10 implementing frequency division multiple access (FDMA) communication techniques. For example, system 10 may comprise a global system for mobile communications (GSM) system, in accordance with European Telecommunication Standards Institute (ETSI) GSM standard. The GSM standard makes use of FDMA techniques in which a frequency band is divided into a plurality of cells, as well as time division multiple access (TDMA) techniques in which time-allocated communication is scheduled during specific time slots within the cells. In the description that follows, many techniques are described in the context of GSM. However, the same or similar techniques could also be used with a wide variety of other wireless protocols or standards that make use of FDMA.

Wireless communication system 10 includes a plurality of base stations 12A-12C (collectively base stations 12) that communicate with a subscriber unit 14. Although a single subscriber unit 14 is illustrated, system 10 typically includes a plurality of such units. Subscriber unit 14 generally refers to a wireless device used by an end user. For example, in a GSM system, subscriber unit 14 typically comprises a mobile radiotelephone. However, subscriber unit 14 could also be implemented in any of a wide variety of other portable computing devices such as a desktop or portable computer, a personal digital assistant (PDA), an interactive television, a wireless data terminal, a wireless data collection device, or any other wireless device configured to communicate in accordance with the techniques described in this disclosure.

Base stations 12 are generally stationary computers that wirelessly communicate with subscriber unit 14 to provide network access to subscriber unit 14. For example, base stations 12 may provide an interface between subscriber unit 14 and a public switched telephone network (PSTN) such that telephone calls can be routed to and from subscriber unit 14. Alternatively or additionally, base stations 12 may be coupled to a packet-based network for transmission of packet-based voice information or packet-based data. Base stations 12 are sometimes referred to as base transceiver systems (BTS).

Wireless communication system 10 operates according to FDMA communication techniques. Frequency division multiple access (FDMA) refers to a wireless communication technique in which an allocated frequency spectrum is divided into a plurality of smaller frequency "cells." Each cell of the allocated spectrum has a carrier signal that can be modulated with data. Each of base stations 12 typically operate in a different frequency cell of the allocated spectrum.

One challenge in FDMA systems, such as system 10, is the process of cell selection or acquisition by subscriber unit 14. During the cell selection process, subscriber unit 14 identifies a desirable cell that can provide network access to subscriber unit 14. If only one of base stations 12 is operated by the network provider of subscriber unit 14, subscriber unit 14 should identify the cell associated with that base station as the desirable communication cell. On the other hand, if two or more of base stations 12 are operated by the network provider of subscriber unit 14, subscriber unit 14 should identify the cell of that network provider for which the received signal strength is highest. If none of base stations 12 are operated by the network provider of subscriber unit 14, subscriber unit 14 should identify a cell based on other priorities. For example, if none of base stations 12 are operated by the network provider of subscriber unit 14, subscriber unit 14 may select a cell operated by a different network provider for which a favorable roaming agreement is in place. Other types of priorities could also be used.

In FIG. 1, the illustrated components of subscriber unit 14 are specifically those components used in the cell selection process. Numerous other components exist for other functions, such as signal encoding and demodulation. For simplicity, however, the additional components are not illustrated.

Receiver/transmitter 20 receives wireless signals 18A-18C (collectively signals 18) from base stations 12 via antenna 21. Receiver/transmitter 20 may also perform various analog signal conditioning functions on received signals, such as filtering or scaling of the signals. Receiver/transmitter 20 forwards received signals to analog-to-digital (A/D) converter 22, which samples the analog signals to generate digital signals. The digital signals sampled from the received analog signal are passed from A/D converter 22 to control unit 24 which performs a cell selection process as described herein.

Control unit 24 may include a number of functional components, e.g., implemented in hardware, software, firmware, or the like, in order to perform the cell selection process. For example, control unit 24 may include a power scan unit 26, a power estimator 28, an ID generator 30 and a cell selector 32. Control unit 24 can be implemented as a digital signal processor (DSP) executing software modules, or may comprise discrete hardware components. Also, control unit 24 may be implemented in any combination of hardware, software, firmware, one or more programmable microprocessors, digital signal processors, or the like. The various components of control unit 24 are illustrated for purposes of explanation, but may be integrated with other components, e.g., within hardware or software. If implemented in software, a memory or other computer readable medium (not shown) may be coupled to control unit 24 in order to store the software instructions loaded into control unit 24 for execution.

Power scan unit 26 scans the cells of an allocated frequency spectrum in order to separate the different signals associated with the various cells. Again, in GSM, the frequency bands surrounding 900 MHz and 1800 MHz are divided into approximately 548 frequency cells of approximately 200 KHz per cell. In that case, power scan unit 26 separates the signals associated with each of the 548 cells.

Power estimator 28 measures and estimates the power of the various cells. Moreover, in accordance with this disclosure, power estimator 28 implements one or more techniques that can improve and expedite the cell selection process. In particular, power estimator 28 accounts for certain factors of system 10, which could otherwise distort accurate power estimation of the cells. Power estimator 28 also maintains a list of the various cells, in an order of estimated power of the different cells from the highest power cell to the lowest power cell. In accordance with this disclosure, the ordered list of cells can be modified relative to the actual power of the various cells measured by power estimator 28, e.g., when power estimator 28 identifies cells that are unlikely to be good candidates.

ID generator 30 uses the ordered list maintained by power estimator 28. In particular, ID generator begins with the highest power cell in the list and generates the network ID for that cell. In GSM, the network ID generation process is a multi-step process. For example, for a given cell in GSM, ID generator 30 receives digital signals from A/D converter 24, and acquires a frequency correction channel (FCCH), which can be used for rough synchronization to the cell. ID generator 30 then decodes a synchronization channel (SCH), which provides basic timing information about the relevant base station 12 associated with the respective cell. Once ID generator 30 has the SCH, it can decode the overhead channels, such as the broadcast channel (BCCH), and acquire the public land mobile network (PLMN) code, which identifies the network associated with the given cell.

Cell selector 32 receives the generated network ID's, e.g., the PLMN codes, and selects a desirable cell for use by subscriber unit 14 in subsequent telecommunication. Cell selector 32 may implement a priority scheme in which highest power cells associated with specific networks are selected, but other cells can be selected if the cells associated with the specific network are not strong enough. For example, if none of base stations 12 are operated by the network provider of subscriber unit 14, cell selector 32 may select a cell operated by a different network provider for which a good roaming agreement is in place. Cell selector 32 then instructs receiver/transmitter 30 to communicate with the base station of the selected cell in order to register for subsequent telecommunication with the respective base station in the selected cell. Ordinarily, there will be a strong preference toward usage of a cell associated with the network provider that issued subscriber unit 14. Nevertheless, a selected cell must meet the minimum power requirements for reliable communication.

Figure 2:
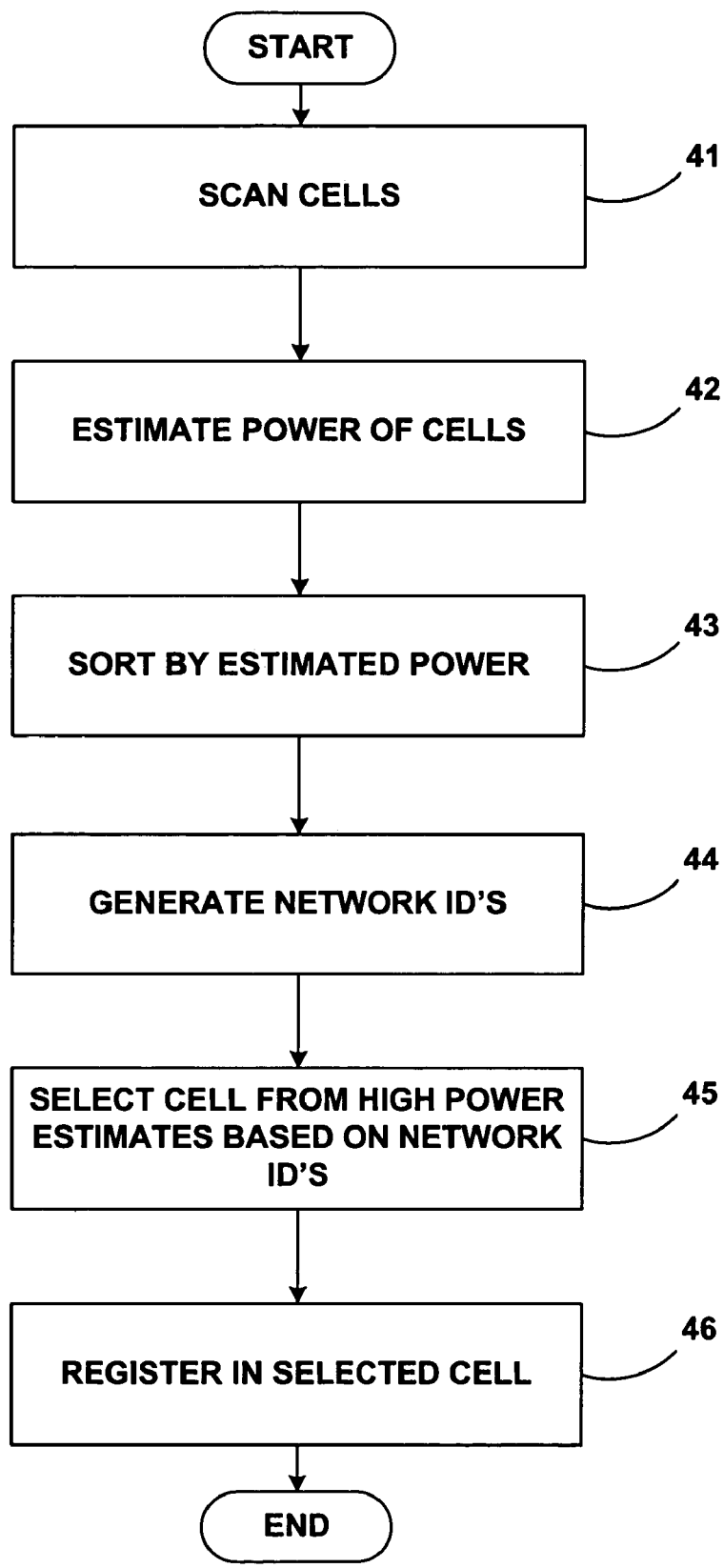
FIG. 2 is a flow diagram illustrating the cell selection process implemented by a subscriber unit of a wireless communication system.

FIG. 2 is a flow diagram illustrating the cell selection process implemented by subscriber unit 14. As shown in FIG. 2, power scan unit 26 scans the cells of an FDMA frequency spectrum (41) to separate the signals of the different cells into frequency bins. Power estimator 28 then estimates the power of the different cells (42), accounting for channel effects which could tend to undermine the reliability of power measurements of power estimator 28. For example, as outlined in greater detail below, power estimator 28 may measure the power, but adjust the measured power to a negligible value if the measured power is less than a predetermined margin, such as 15 decibels, of a measured power associated with a cell in an adjacent frequency bin. In that case, the measured power can likely be attributed to the power of the adjacent cell and not the actual cell being measured. Accordingly, it is desirable to eliminate such cells from consideration in the cell selection process to avoid false detection of cells that only appear to meet the desired minimum power requirements because of overlapping affects.

Alternatively, power estimator 28 may implement a filtering technique that can ensure that power associated with an adjacent cell will not substantially affect the power measurements for a given cell. In particular, the filtering technique can be used to narrow the range of frequency that is used for power estimation purposes, reducing the likelihood that signal power from one cell will produce the appearance of signal power for adjacent cells.

Power estimator 28 sorts the cells based on estimated power of the cells (43). In particular, power estimator 28 generates a list of cells, from highest to lowest in estimated power. ID generator 30 generates network ID's for the cells (44), and cell selector 32 selects a desirable cell based on the network ID's and the estimated power levels (45). For example, ID generator 30 may generate network ID's beginning with the highest power cells, and once cell selector 32 identifies the network ID associated with the service provider of subscriber unit 14, that cell can be selected, provided the power level of the cell is sufficient, and the ID generation process can be terminated.

In accordance with GSM standards, the selected cell may be required to be within the 70 strongest cells, i.e., the cells having the highest estimated power levels. Thus, if the network ID associated with the service provider of subscriber unit 14 is not within the 70 most powerful cells, cell selector 32 selects a cell based on other criteria, such as whether a cell is associated with a different service provider for which a favorable roaming agreement has been established. Once the cell has been selected from the 70 highest power estimates (45), subscriber unit 14 registers with that selected cell (46). For example, receiver/transmitter 30 can transmit the registration information to one of base stations 12 associated with the selected cell, and thereafter use the cell for calls to and from subscriber unit 14.

In GSM and other telecommunication protocols that make use of FDMA, adjacent cells often have slight frequency overlap. Therefore, if a signal is present in one cell, that signal can affect the power measurements of adjacent cells, i.e., cells having a frequency band that is immediately next to the frequency band of the cell where the signal is actually present. In particular, the signal in a given cell may be substantially centered within the pertinent frequency band, but have frequency components that extend into adjacent cells. This overlapping effect can lengthen the cell selection process due to false detection of adjacent cells.

When a signal is present in a first GSM cell, the cells immediately adjacent that first cell typically exhibit a signal approximately 16 decibels below that of the first cell, even if no signal is actually present in the adjacent cells. Moreover, in some cases, signals approximately 16 decibels below that of the first cell can cause the adjacent cells to be within the 70 most powerful cells, making them candidates for further processing in accordance with the GSM standard. If no accounting is made for this overlapping effect, subscriber unit 14 may need to actually process (3*69+1)=207 cells in order to ensure that the 70 most powerful cells were actually considered by cell selector 32. This can add significant time and processing overhead to the cell selection process.

A better approach is to attempt to remove the adjacent cells from consideration, if the power in the adjacent cells is caused only by the presence of a signal in the first cell. Subscriber unit 14 can improve the cell selection process by accounting for this overlapping effect. Two alternative embodiments for accounting for this overlapping effect are described in greater detail below.

The first approach identifies a "false positive" when the measured power of a cell is less than that of an adjacent cell by a defined value, such as less than 15 decibels below that of the adjacent cell. In that case, the cell can be declared a false positive and the estimated power for that cell can be set to a negligible value. The second approach implements a filtering technique for power estimation. In particular, upon receiving a signal associated with a cell spanning a first frequency range, the signal can be filtered to a second frequency range, wherein the second frequency range is smaller than the first frequency range. The measured power of the filtered signal can then be used to identify an estimate of power associated with the cell. Such filtering specifically for power estimation can substantially reduce overlapping of power between adjacent cells.

Figure 3:
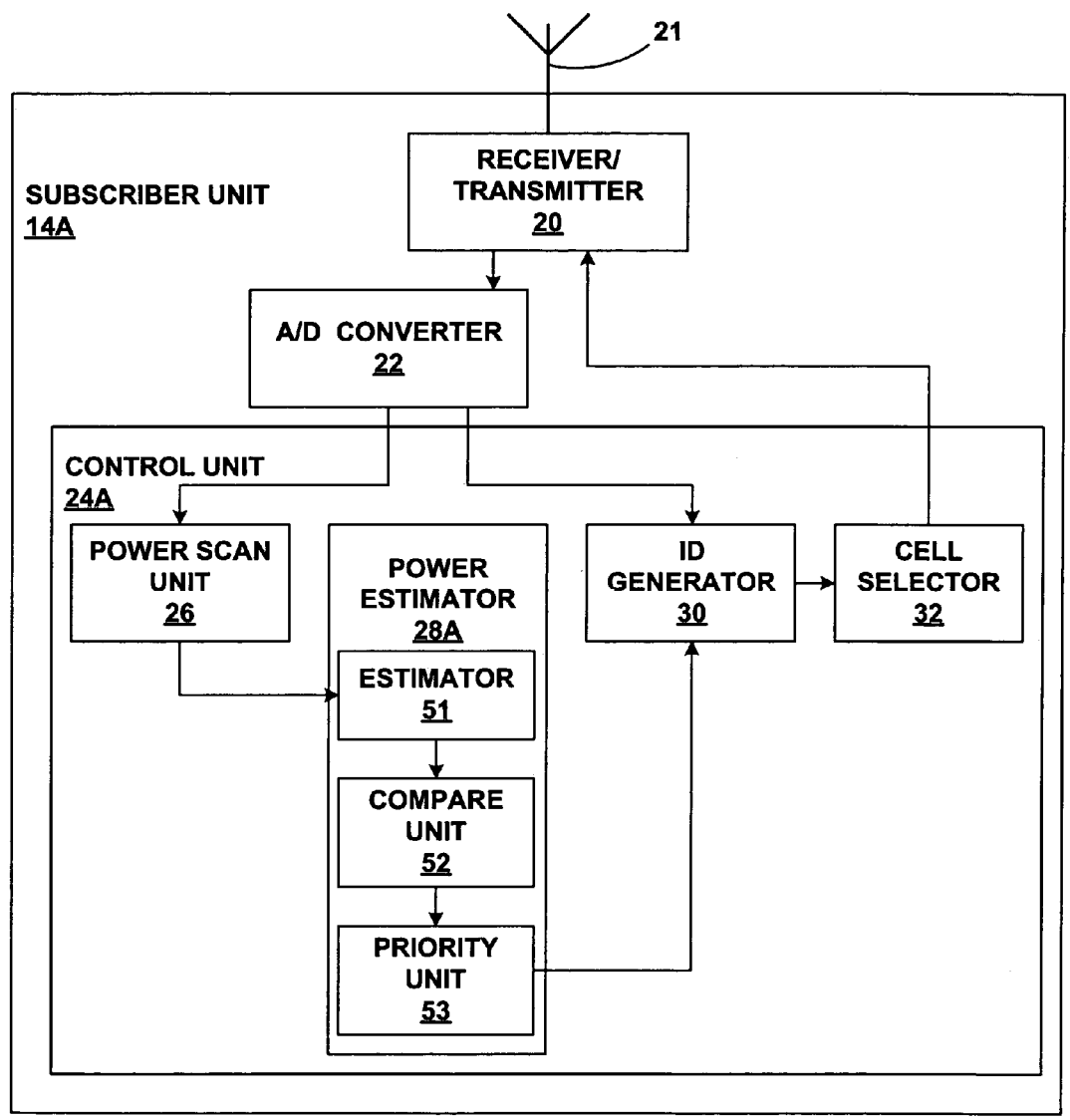
FIG. 3 is a block diagram of one embodiment of a subscriber unit according to this disclosure.

FIG. 3 is a block diagram of subscriber unit 14A, which may correspond to subscriber unit 14 of FIG. 1. In this case, subscriber unit 14A comprises a power estimator 28A that includes an estimator 51, a compare unit 52 and a priority unit 53. Compare unit 52 identifies a "false positive" when the power of a cell measured by estimator 51 is less than that of an adjacent cell by a defined value, such as less than 15 decibels below that of the adjacent cell. In that case, compare unit 52 can declare a false positive and the estimated power for that cell can be set to a negligible value, thereby eliminating it from consideration among the highest power cells scanned by subscriber unit 14A. In particular, based on the negligible estimated power value, priority unit 53 will then prioritize that cell at a very low priority.

Receiver/transmitter 20 receives wireless signals via antenna 21, and may perform various analog signal conditioning functions on received signals, such filtering or scaling the signals. Receiver/transmitter 20 forwards received signals to analog-to-digital (A/D) converter 22, which samples the signals to generate digital signals. The digital signals indicative of the received analog signal are passed from A/D converter 22 to control unit 24A, which performs the cell selection process.

Power scan unit 26 scans the cells of an allocated frequency spectrum in order to separate the different signals associated with the various cells. Power estimator 28A measures and estimates the power of the various cells and performs techniques which can accelerate the cell selection process. In particular, estimator 51 measures the power of a given cell, and compare unit 52 compares the measured power for that cell to the measured power associated with cells which are adjacent to that cell in terms of frequency. If compare unit 52 determines that the measured power is less than that of an adjacent cell by a defined value, such as less than 15 decibels below that of the adjacent cell, compare unit 52 sets a value indicative of the estimated power for that cell to a negligible value. Priority unit 53 will then prioritize that cell at very low priority based on the value set by compare unit. If, on the other hand, compare unit 52 determines that the measured power is not less than that of an adjacent cell by the defined value, priority unit 53 prioritizes the cell based on the power measured by estimator 51 for that cell.

ID generator 30 uses the ordered list maintained by priority unit 53. In particular, ID generator begins with the highest power cell in the list and generates the network ID for that cell. Again, in the context of GSM, ID generator 30 acquires a frequency correction channel (FCCH), then decodes a synchronization channel (SCH), and finally decodes a broadcast control channel (BCCH) to obtain a public land mobile network (PLMN) code, which identifies the network associated with the given cell.

Cell selector 32 receives the generated network ID's, e.g., the PLMN codes, and selects a desirable cell for use by subscriber unit 14 in subsequent telecommunication. In accordance with this disclosure, acquisition of network ID's should not attempted for false positive cells in which the power of that cell can be attributed to power of an adjacent cell because power estimator 28A identifies and reduces the power for such false positive cells. In this manner, the cell selection process can be improved, avoiding any processing delay otherwise associated with resolution of network ID's for the false positive cells.

Figure 4:
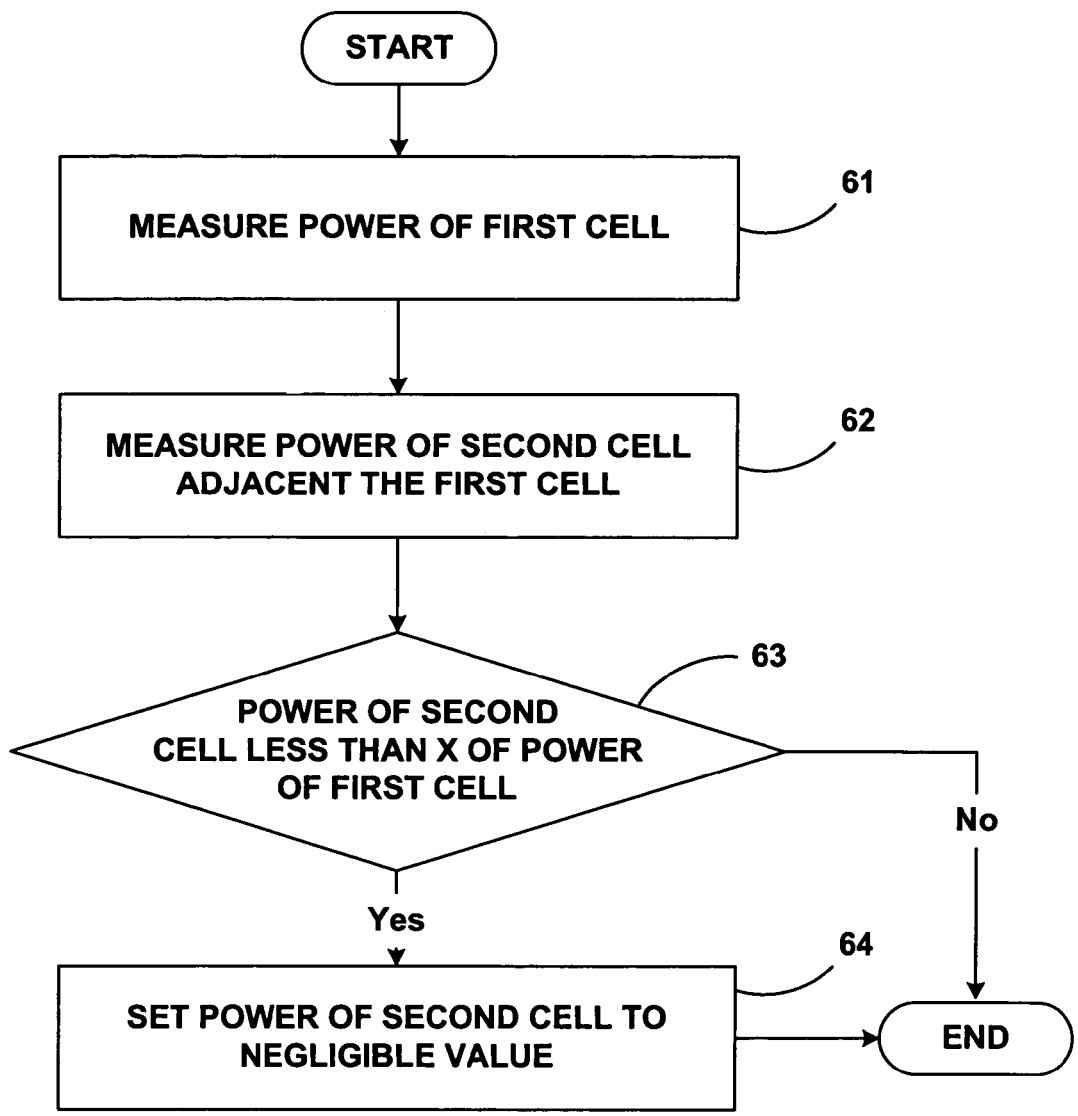
FIG. 4 is a flow diagram illustrating a process implemented within the subscriber unit illustrated in FIG. 3.

FIG. 4 is a flow diagram illustrating a process implemented by power estimator 28A of FIG. 3. As shown in FIG. 4, estimator 51 measures power of a first cell (61) and then measures power of a second cell, which is adjacent the first cell (62). Compare unit 52 may maintain a table, or the like, listing measured power of various cells. Compare unit 52 determines whether the power of the second cell is more than a predetermined margin (X) less than the power of the first cell, where X represents a defined value (63), such as a value between 10 and 20 decibels depending on filtering. For example, the value X may be approximately 15 decibels. In any case, if compare unit 52 determines that the power of the second cell is more than X less than the power of the first cell (yes branch of 63), compare unit 52 sets a value indicative of the estimated power of the second cell to a negligible value (64). Priority unit 53 will then prioritize that cell at very low priority based on the value set by compare unit. On the other hand, if compare unit 52 determines that the power of the second cell not more than X less than the power of the first cell (no branch of 63), no adjustments are made. In that case, priority unit 53 prioritizes the cell based on the power measured by estimator 51 for that cell.

In accordance with this disclosure, the process of FIG. 4 may be applied with respect to the two immediately adjacent cells of a given cell. In other words, for each cell, the process of FIG. 4 may be applied with respect to an earlier cell, e.g., having a center frequency slightly less than the current cell, and a later cell, e.g., having a center frequency that is slightly greater than the current cell. Put another way, the "second cell" referred to in FIG. 4, may correspond to the either the earlier cell or the later cell, and the process can be applied with respect to both of these adjacent cells to the first cell. Moreover, the process of FIG. 4 can be repeated for each of the plurality of cells in the allocated spectrum.

Figure 5:
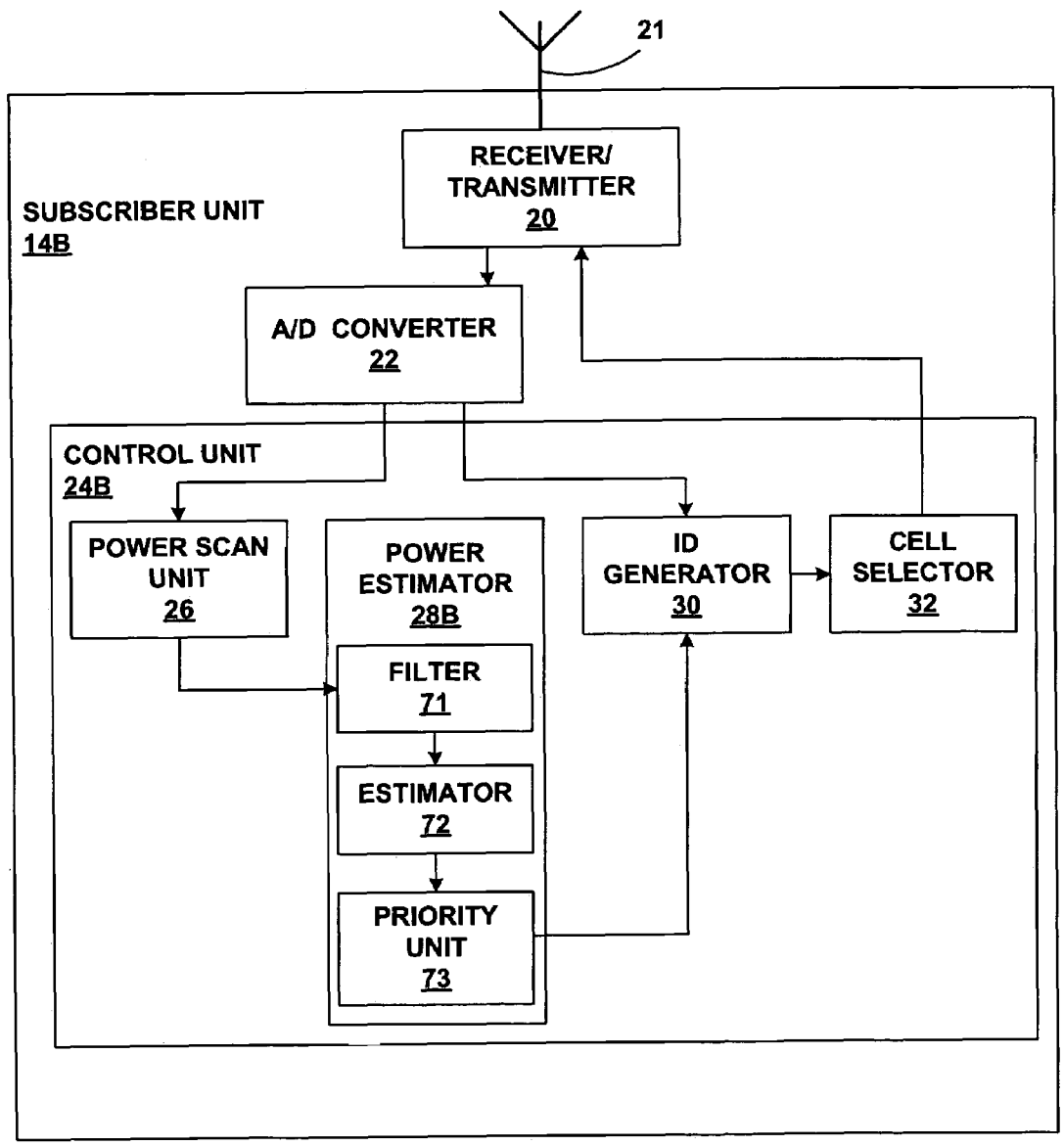
FIG. 5 is a block diagram of another embodiment of a subscriber unit according to this disclosure.

FIG. 5 is a block diagram of subscriber unit 14B, which may correspond to subscriber unit 14 of FIG. 1. In this case, according to another embodiment, subscriber unit 14B comprises a power estimator 28B that includes a filter 71, an estimator 72, and a priority unit 73. Filter 71 receives a signal associated with a cell spanning a frequency range of X and filters the signal to a frequency range of Y, wherein Y is smaller than X. Estimator 72 measures the power of the filtered signal in order to identify an estimate of power associated with the cell. By filtering the cell to a frequency range smaller than the cell, the effects of overlap of the power of adjacent cells can be substantially reduced or eliminated. Accordingly, the power estimates maintained by priority unit 73 should not include any false positives in which the measured power is skewed by the presence of signals in adjacent cells.

Like in subscriber unit 14A (FIG. 3), in subscriber unit 14B (FIG. 5), receiver/transmitter 20 receives wireless signals via antenna 21, and may perform various analog signal conditioning functions on received signals, such as filtering or scaling the signals. Receiver/transmitter 20 forwards received signals to analog-to-digital (A/D) converter 22, which samples the signals to generate digital signals. The digital signals indicative of the received analog signal are passed from A/D converter 22 to control unit 24B, which performs the cell selection process.

Power scan unit 26 scans the cells of an allocated frequency spectrum in order to separate the different signals associated with the various cells. Power estimator 28B measures and estimates the power of the various cells and performs techniques which can accelerate the cell selection process. Filter 71 receives a signal associated with a cell spanning a frequency range of X and filters the signal to a frequency range of Y, wherein Y is smaller than X. In particular, the frequency range Y falls within the frequency range X, and is narrower than the frequency range X. In this manner, the narrower frequency range Y tends to filter out the effects of adjacent cells. For example, in GSM, the value of X would correspond to approximately 200 KHz, because that is the approximate width of a cell. In that case, the value Y may be approximately 100 KHz centered about the center frequency of the given cell.

Estimator 72 then measures the power of the filtered signal in order to identify an estimate of power associated with the cell. By filtering the cell to a frequency range smaller than the cell, overlap of the power of adjacent cells can be substantially reduced or eliminated. Accordingly, the power estimates maintained by priority unit 73 should not include any false positives in which the measured power is skewed by the presence of signals in adjacent cells.

Figure 6:
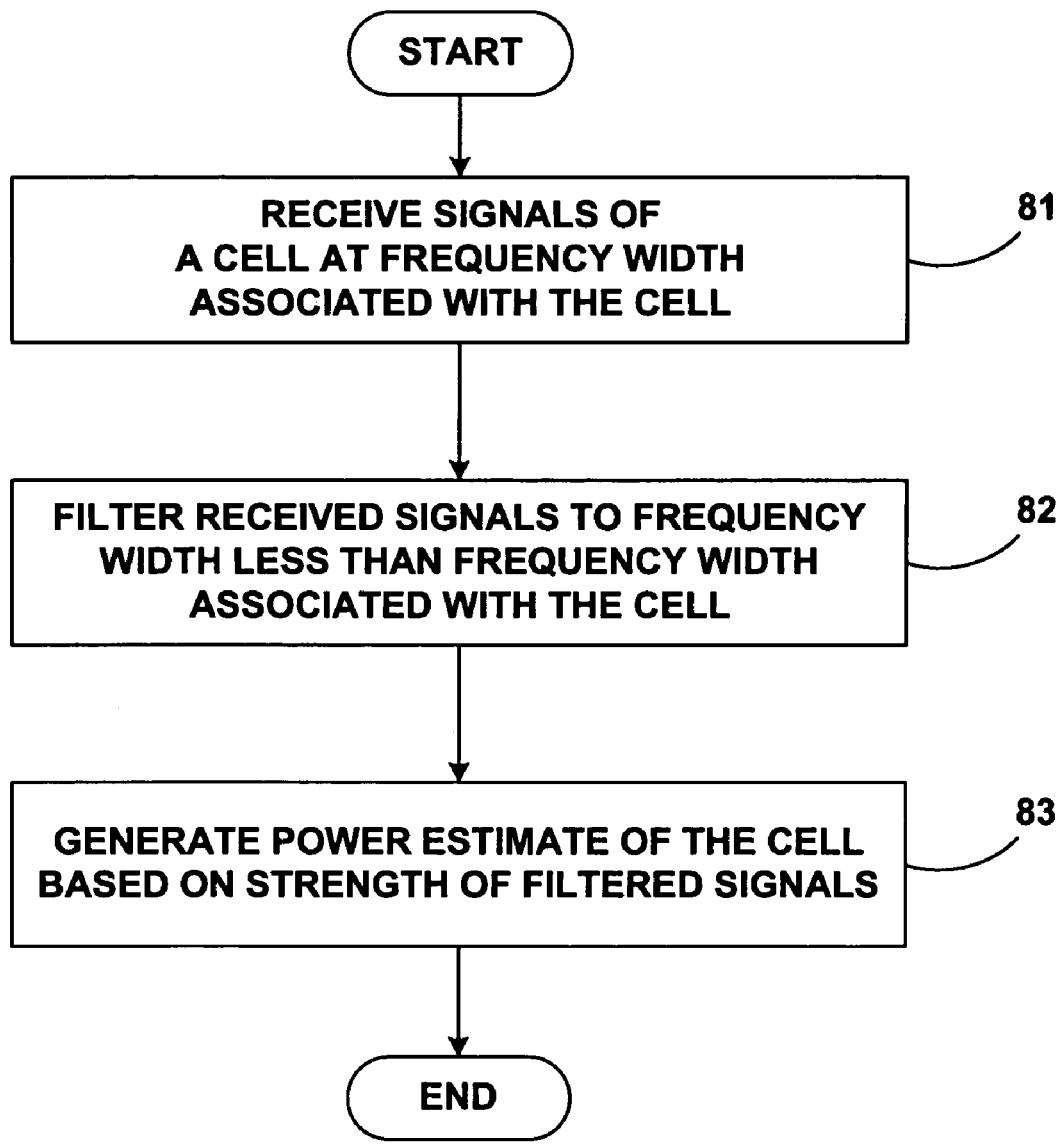
FIG. 6 is a flow diagram illustrating a process implemented within the subscriber unit illustrated in FIG. 5.

FIG. 6 is a flow diagram illustrating a process implemented by power estimator 28B of FIG. 5. As shown in FIG. 6, filter 71 receives signals of a cell at a frequency width associated with the cell (81), and filters the signals to a frequency width smaller than the frequency width associated with the cell (82). For example, a 200 KHz cell spanning from 900,000 KHz to 900,200 KHz may be filtered to a 100 KHz width spanning from 900,050 KHz to 900,150 KHz, although the desirable filtered range is subject to a wide variety of implementations. In any case, estimator 72 generates a power estimate of the cell based on the strength of the filtered signal (83). Because the signal associated with the cell is filtered to a frequency range smaller than that of the cell, overlap of the power of adjacent cells can be substantially reduced or eliminated. The process of FIG. 6 can be repeated for each of the plurality of cells in the allocated spectrum.

A number of embodiments have been described. In particular, power estimation techniques have been described which account for signal overlap between adjacent cells of a FDMA system. The techniques may be implemented in a subscriber unit 14 in hardware, software, firmware, or the like, in order to perform cell selection or manual PLMN list generation. Cell selection generally refers to the search for a specific desired PLMN. The acquisition of PLMNs can be terminated once the desired PLMN is identified. Manual PLMN list generation generally refers to a process in which a user manually instructs the subscriber unit to display all available networks so that the user can choose a network. In manual PLMN list generation, the subscriber unit will acquire the network ID's for a number of high power cell in the list. In accordance with this disclosure, either cell selection or manual PLMN list generation can be accelerated using one or more of the techniques described herein.

Example hardware implementations may include implementations within a digital signal processor (DSP), an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer readable medium may store or otherwise comprise computer readable instructions, i.e., program code that can be executed by a processor or DSP of a subscriber unit to carry out one of more of the techniques described above.

For example, the computer readable medium may comprise random access memory (RAM), read-only memory (ROM), non-volatile random access memory (NVRAM), electrically erasable programmable read-only memory (EEPROM), flash memory, or the like, coupled to control unit 24 of subscriber unit 14. In that case, control unit 24 may comprise a processor or DSP that executes various software modules stored in the computer readable medium. Numerous other modifications may be made without departing from the spirit and scope of this disclosure. Accordingly, these and other embodiments are within the scope of the following claims.

The invention claimed is:
1. A method comprising:
    measuring power of a first signal associated with a first cell of a frequency division multiple access (FDMA) system;
    measuring power of a second signal associated with a second cell of the FDMA system, the second cell being adjacent to the first cell in terms of frequency; and
    setting a value indicative of the measured power of the second signal to a negligible value when the measured power of the second signal is at least a predetermined margin value lower than the measured power of the first signal.
2. The method of claim 1, wherein the FDMA system comprises a global system for mobile communications (GSM) system.
3. The method of claim 1, wherein the negligible value is approximately equal to zero.

4. The method of claim 1, wherein the predetermined margin value is in a range of approximately 10 to 20 decibels.

5. The method of claim 4, wherein the predetermined margin value is approximately 15 decibels.

6. The method of claim 1, further comprising:
measuring power of a plurality of signals associated with a plurality of cells of the FDMA system; and
setting a value indicative of a measured power of a given one of the signals associated with a given cell to a negligible value when the measured power of the given signal is at least a predetermined margin value lower than a measured power of another one of the signals associated with an adjacent cell to the given cell.

7. The method of claim 6, further comprising:
prioritizing the plurality of signals based on values indicative of the measured power of the signals;
selecting a desirable one of the cells based at least in part on the prioritization; and
registering with a network associated with the desirable cell.

8. A subscriber unit of a frequency division multiple access (FDMA) system comprising:
a receiver to receive a first signal associated with a first cell of the FDMA system and a second signal associated with a second cell of the FDMA system, the second cell being adjacent to the first cell in terms of frequency; and
a control unit to measure power of the first and second signals and set a value indicative of the measured power of the second signal to a negligible value when the measured power of the second signal is at least a predetermined margin value lower than the measured power of the first signal.

9. The method of claim 8, wherein the FDMA system comprises a global system for mobile communications (GSM) system.

10. The subscriber unit of claim 8, wherein the negligible value is approximately equal to zero.

11. The subscriber unit of claim 8, wherein the predetermined margin value is in a range of approximately 10 to 20 decibels.

12. The subscriber unit of claim 8, wherein the predetermined margin value is approximately 15 decibels.

13. The subscriber unit of claim 8, wherein the receiver receives a plurality of signals associated with a plurality of cells of the FDMA system, and the control unit measures power of the plurality of signals and sets a given value indicative of a measured power of a given one of the signals associated with a given one of the cells to a negligible value when the measured power of the given signal is at least the predetermined margin value lower than a measured power of another signal associated with an adjacent cell to the given cell.

14. The subscriber unit of claim 13, wherein the control unit prioritizes the plurality of signals based on values indicative of the measured power of the signals, selects a desirable one of the cells based at least in part on the prioritization, and causes the subscriber unit to register with a network associated with the desirable cell.

15. A computer-readable medium comprising instructions to cause subscriber unit of a frequency division multiple access (FDMA) system to:
measure power of a first signal associated with a first cell of the FDMA system;
measure power of a second signal associated with a second cell of the FDMA system, the second cell being adjacent to the first cell in terms of frequency; and
set a value indicative of the measured power of the second signal to a negligible value when the measured power of the second signal is at least a predetermined margin value lower than the measured power of the first signal.

16. The computer-readable medium of claim 15, wherein the FDMA system comprises a global system for mobile communications (GSM) system.

17. The computer-readable medium of claim 15, wherein the predetermined margin value is in a range of approximately 10 to 20 decibels.

18. A subscriber unit of a frequency division multiple access (FDMA) system comprising:
means for receiving a first signal associated with a first cell the FDMA system and a second signal associated with a second cell of the FDMA system, the second cell being adjacent to the first cell in terms of frequency;
means for measuring power of the first and second signals; and
means for setting a value indicative of the measured power of the second signal to a negligible value when the measured power of the second signal is at least a predetermined margin value lower than the measured power of the first signal.

19. The subscriber unit of claim 18, wherein the FDMA system comprises a global system for mobile communications (GSM) system, and the predetermined margin value is in a range of approximately 10 to 20 decibels.

* * * * *